United States Patent [19]

D'Alessandro et al.

[11] Patent Number: 4,607,904
[45] Date of Patent: Aug. 26, 1986

[54] BATTERY TERMINAL CONNECTOR AND HANDLE

[75] Inventors: Robert D'Alessandro, Bedford Hills; Carlos Cardenas, Hartsdale; Gordon E. Kaye, Garrison, all of N.Y.

[73] Assignee: Duracell Inc., Bethel, Conn.

[21] Appl. No.: 644,406

[22] Filed: Aug. 27, 1984

[51] Int. Cl.[4] ............................................. H01R 3/00
[52] U.S. Cl. ................................ 339/108 R; 339/152; 339/232
[58] Field of Search ................. 339/19, 108 R, 110 R, 339/152, 232, 224; 224/902; 294/165, 137, 145

[56] References Cited

U.S. PATENT DOCUMENTS 1,378,952  5/1921  Hawthorne ........................ 339/152
1,460,604  7/1923  Potter ................................ 339/152

Primary Examiner—John McQuade
Attorney, Agent, or Firm—Ronald S. Cornell; Israel Nissenbaum

[57] ABSTRACT

A battery terminal connector which electrically interconnects the terminals of two or more batteries and which terminal connector is tapped to provide terminal connection to an external device. The terminal connector also serves as a carrying handle for the batteries. The connector is comprised of two stiff metal members contained within an insulative handle housing offset from the surface of the battery or batteries to permit finger insertion. A portion of said metal members is exposed through said insulative handle housing for external electrical connection. The ends of the metal members are shaped for connection to the battery terminals and the metal members are sized to fit between such battery terminals.

6 Claims, 11 Drawing Figures

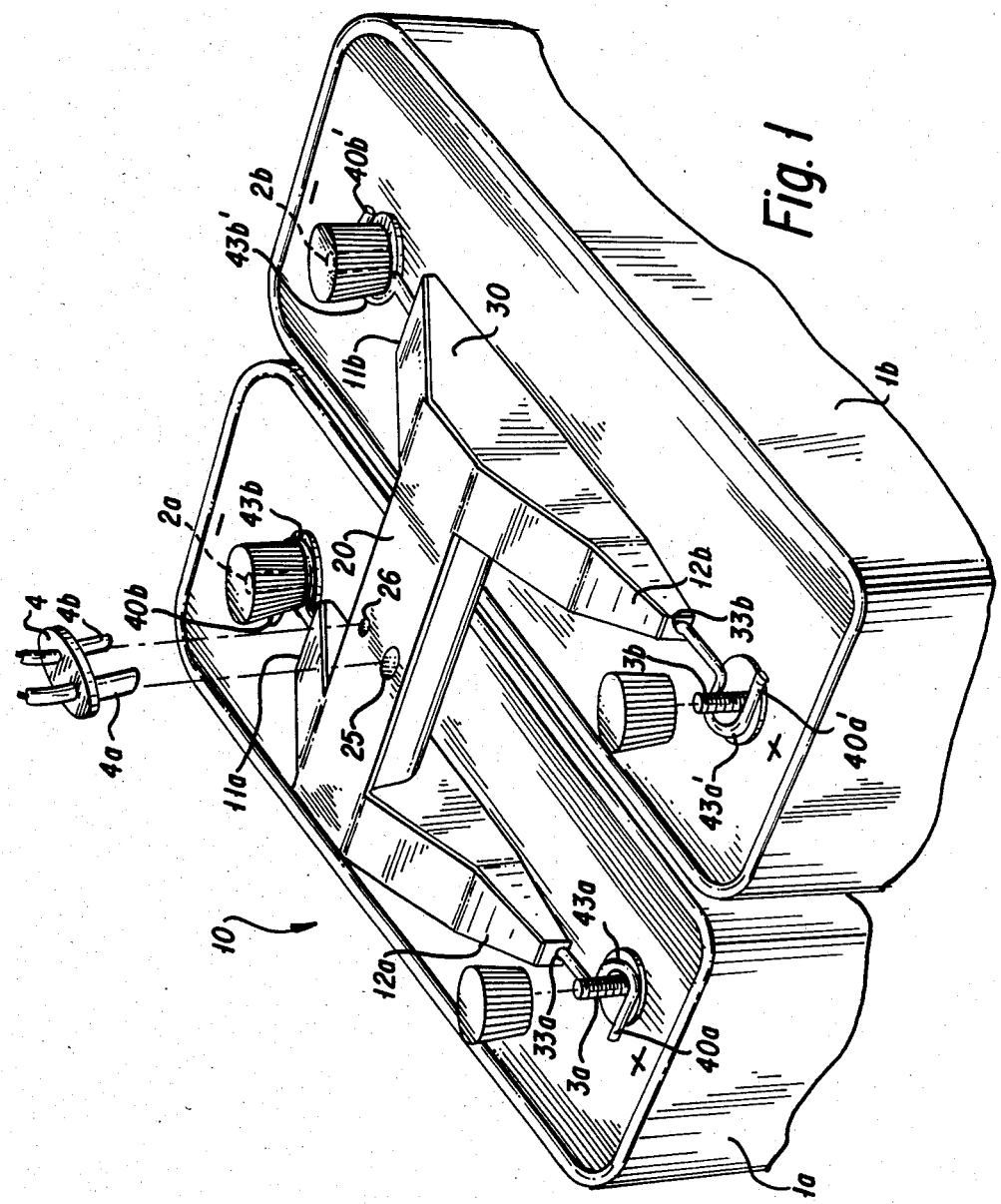

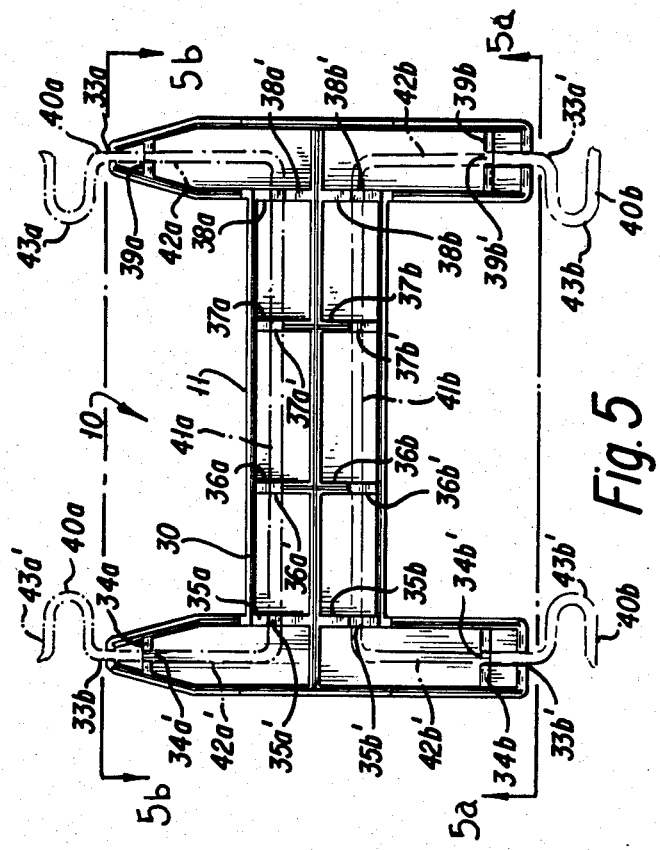
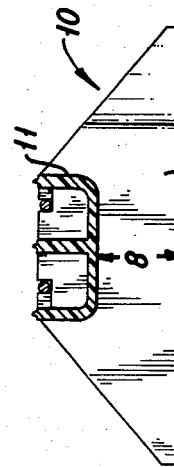
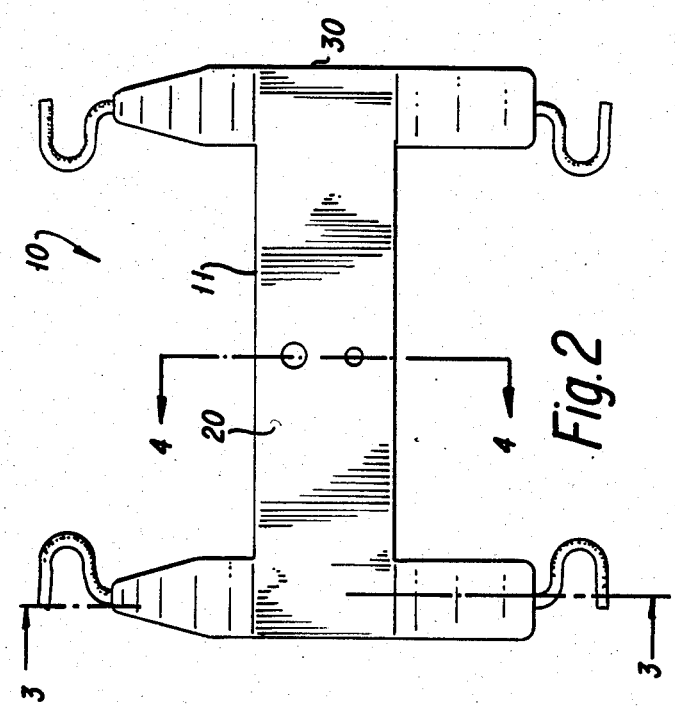
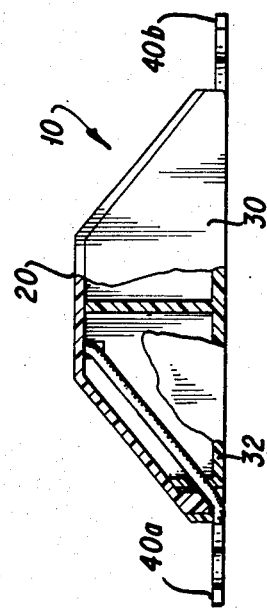

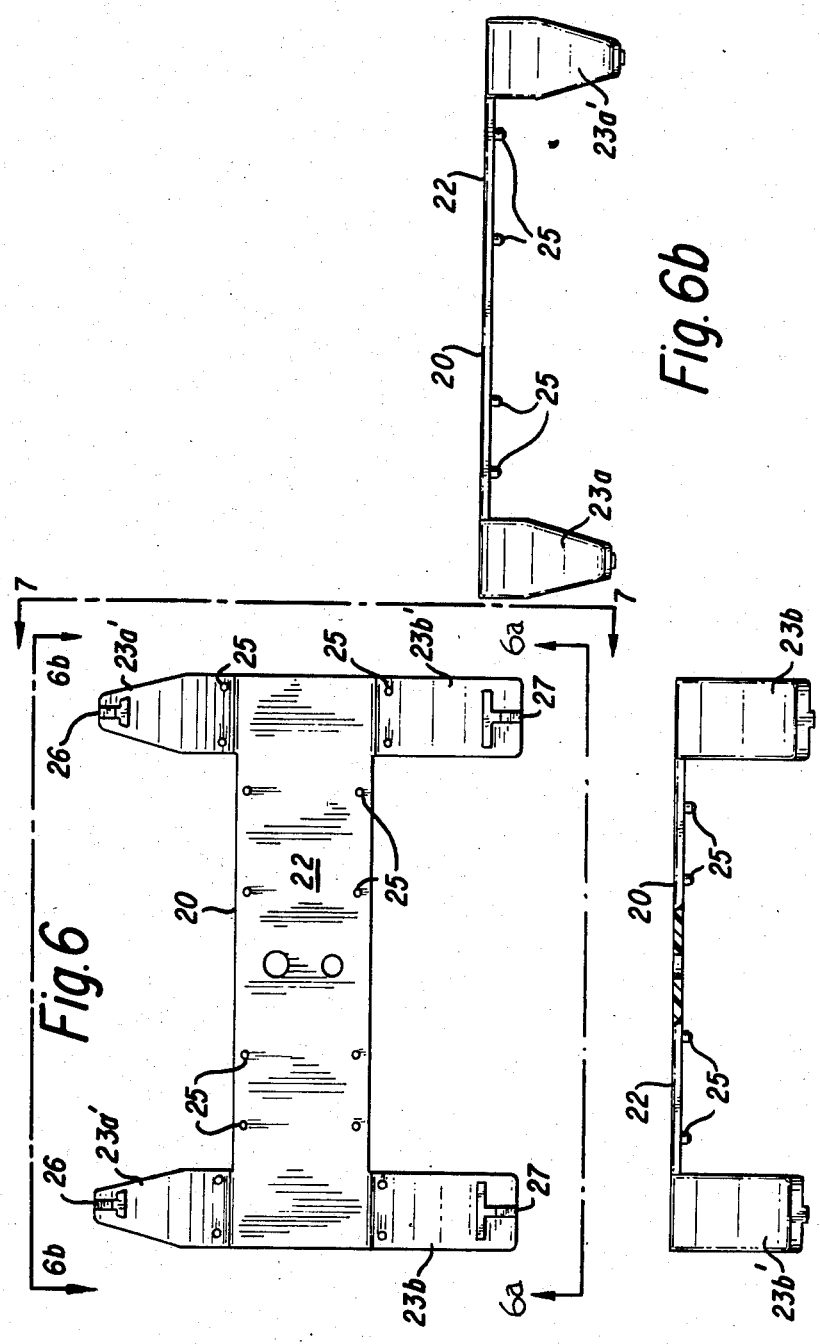

BATTERY TERMINAL CONNECTOR AND HANDLE

This invention relates to terminal connectors for electrochemical cells and batteries.

Intercell terminal connectors have been utilized in the past to connect electrochemical cells into series or parallel relationships to boost either voltage or current as desired. With such intercell terminal connectors appropriate terminals are electrically interconnected with metal tabs or wires with exposed terminals generally being tapped for circuit attachment to an external electrical device. Such intercell connectors have however been generally made of structurally unsupportable or pliable materials such as thin wires or tabs which were generally covered with an insulative material and placed against the battery structure for support.

It is an object of the present invention to provide a structurally self-supporting intercell (or interbattery) terminal connector which interconnects the terminals of the cells or batteries into either series or parallel relationship and which connector itself is directly tapped for external electrical connection.

It is a further object of the present invention to provide such connector whereby it also functions as a carrying handle for the interconnected cells.

These and other objects, features and advantages of the present invention will become more evident from the following discussion as well as the drawings in which:

FIG. 1 is an isometric view of two batteries being electrically and physically interconnected by the connector of the present invention;

FIG. 2 is a top view of the battery connector of the present invention;

FIG. 3 is a sectioned end view taken along line 3—3 of FIG. 2;

FIG. 4 is a sectioned end view taken along line 4—4 of FIG. 2;

Figure 7:
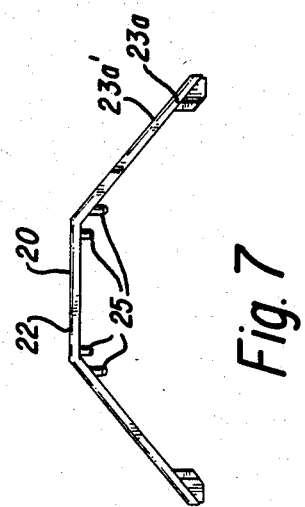
Figure 5A:
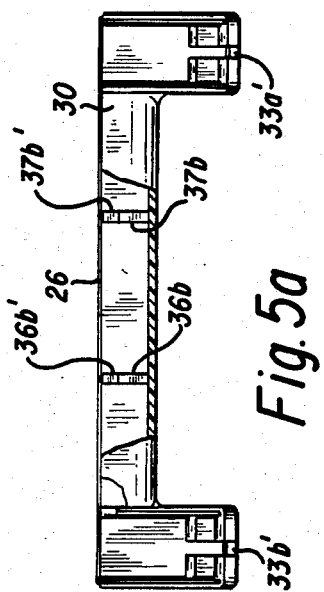
FIG. 5 is a top view of the base of the battery connector.
Figure 5B:

FIGS. 5a and 5b are side views taken along lines 5a—5a and 5b—5b respectively of FIG. 5;

FIG. 6 is a bottom view of the cover member of the battery connector;

FIGS. 6a and 6b are opposite side views respectively of the cover member of FIG. 6 taken along lines 6a—6a and 6b—6b respectively; and FIG. 7 is an end view of the cover member of FIG. 6 taken along line 7—7.

Generally the present invention comprises an externally deployed intercell or interbattery terminal connector with which the terminals of the cells or batteries (hereinafter, for simplicity, the terms battery and batteries includes cell and cells) are interconnected in series or parallel arrangement and wherein the connector itself is tapped for electrical connection to an external appliance. The connector further embodies means whereby it can also function as a carrying handle for the interconnected batteries. The terminal connector of the present invention is comprised of at least two self-supportive metallic members having means thereon for interconnection with the terminals of batteries in a relatively fixed but removable manner. The metallic members are enclosed within an insulative member having means therein for permitting interconnection of the metallic members with the battery terminals and for permitting access for external electrical connection to said metallic members. Such means preferably comprises apertures which permit the ends of the metal members to extend externally for connection to the battery terminals and at least one aperture for permitting electrical contacts to contact the metal members for external electrical connection. In a preferred embodiment the metallic members are comprised of stiff metal wire, e.g. coat hanger wire, with full or partial loops at the ends thereof whereby they may be attached to batteries such as the 926 designated type having screw lugs for terminal connection. In a parallel arrangement, wherein individual battery power is to be boosted, each metal wire interconnects terminals of the same polarity. In a series arrangement, for voltage boosting, each metal wire interconnects terminals of opposing voltage. The wires are enclosed and fixedly held within an insulative plastic housing, preferably rigid, which has apertures for allowing the ends of the wires to protrude therefrom for connection to the battery terminals. The plastic housing is further apertured for permitting external electrical contact with each of the connector wires. The metal wires and the plastic housing are spaced (about 0.6"–1.5 cm) from the interconnected batteries in the area spanning such batteries whereby such spacing permits finger insertion. The plastic housing thereby functions as a handle for the interconnected batteries.

With specific reference to the drawings, FIGS. 1 and 2 show the battery terminal connector 10, with FIG. 1 depicting said battery terminal connector 10 being attached to batteries 1a and 1b (926 type) for parallel battery interconnection. Battery terminal connector 10 is comprised of four elements, insulative plastic base member 30, insulative plastic cover member 20 and metal wires 40a and 40b sandwiched between said base and cover members. Apertures 33a and 33b permit the ends of wire member 40a with end loops 43a and 43a' to extend externally for connection with screw lugs 3a and 3b, the positive terminals of batteries 1a and 1b respectively. Similarly, other apertures (not shown) permit extension of the ends of wire 40b with end loops 43b and 42b' for connection with screw lugs 2a and 2b, the negative terminals of batteries 1a and 1b respectively. Wires 40a and 40b thereby become the positive and negative terminals for the interconnected batteries 1a and 1b and are accessed, as shown, through apertures 45 and 46 in plastic cover member 20. Plug member 4 of an external electrical device is inserted within such apertures for external electrical connection. The prongs 4a and 4b of plug member 4 and the apertures 45 and 46 are keyed to permit insertion in only one direction in order to maintain proper polarity. Terminal access apertures 45 and 46 are positioned above each of wires 40a and 40b respectively and offset therefrom whereby prong members 4a and 4b of plug 4, when inserted in apertures 45 and 46, are wedged against the wire members for positive terminal engagement. In order to help ensure proper terminal connections the plastic housing is asymmetrical with squared off portions 11a and 11b shown as being adjacent the negative terminals of the batteries and tapered portions 12a and 12b being adjacent the positive terminals of the batteries.

As more clearly seen in FIGS. 3, 4, 5, 5a and 5b plastic base member 30 supports wire members 40a and 40b in a fixed position within the terminal connector by means of rib supports 34a–39a and 34b–39b respectively. Cutouts 34a'–39a' and 34b'–39b' in each of said rib supports respectively accommodate wires 40a and 40b respectively at various points of their length. Central cutouts 36a', 37a' and 36b', 37b' are of an "L" shaped configuration to permit outward torsional movement of wires 40a and 40b respectively, upon wedged engagement of prong members 4a and 4b with the central portions of wires 40a and 40b. "U" shaped cutouts 35a', 38a' and 35b', 38b' provide supportive biasing for such wedged engagement.

Wires 40a and 40b are of identical configuration and are comprised of straight sections 41a and 41b respectively which are supported by ribs 35a–38a and 35b–38b respectively. Sections 42a & 42a' are parallel to each other and are at right angles to straight section 41a and terminate in angled terminal connecting loops 43a and 43a'. Similarly sections 42b & 42b' are parallel to each other and are at right angles to straight section 41b and terminate in angled terminal connecting loops 43b and 43b'. Terminal connecting loops 43a & 43a' and 43b & 43b' are angled such that when wires 40a and 40b are fixedly positioned on base member 30 they are coincident with the bottom 32 of said base member. Right angled sections 42a & 42a' with terminal connecting loops 43a & 43a' are fixed into position by ribs 34a and 39a and cutouts 34a' and 39a' therein as well as apertures 33a and 33a' through which said loops extend for external connection to the battery terminals. Similarly right angled sections 42b & 42b' with terminal connecting loops 43b & 43b' are fixed into position by ribs 34b and 39b and cutouts 34b' and 39b' therein as well as apertures 33b and 33b' through which said loops extend for external connection to the battery terminals. The distance between apertures 33a and 33a' as well as the distance between apertures 33b and 33b' is sized to be substantially equal to the distance between the terminals of the batteries to be interconnected by the terminal connector.

In order to enable the terminal connector 10 to function as a handle for the interconnected batteries central section 11 is elevated by space 8 to permit finger insertion. Accordingly, wire sections 42a & 42a' and 42b & 42b' of wires 40a and 40b are positioned in the terminal connector at an angle of about 30° from the horizontal plane.

Terminal connector cover member 20 shown in FIGS. 6, 6a, 6b and 7 is comprised of central planar section 22 and angled sections 23a & 23a' and 23b and 23b' for direct seating upon corresponding portions of base member 30. Small pipe 25 as well as shaped ridges 26 and 27 provide frictional contact with the cofitting walls of base member 30 for ultrasonic sealing of the cover member to the base member.

It is understood that the above description and the embodiment shown in the drawings are illustrative in nature and that changes may be made in the configuration, structural members, and the batteries to be used therewith. For example though the drawings illustrate a parallel type connection between the cells, the terminal connectors may be modified to provide a series connection if desired. In such embodiment the external connector completes the terminal connection. Other changes may be similarly made without departing from the scope of the present invention as defined by the following claims.

What is claimed is:

1. A terminal connector for externally interconnecting the terminals of two batteries, said connector comprising at least two separated metallic terminal connecting elements contained within an insulative housing which is adapted to span across said batteries characterized in that said metallic terminal connecting elements are structurally self supportive and wherein each of said metallic terminal connecting elements comprises portions thereof which protrude from said insulative housing for electrical and mechanical connection with said terminals, said insulative housing having an elevated section thereof with said section being elevated from said batteries, when interconnected by said connector, in the area where said housing spans and is directly above said batteries, by a distance sufficient to permit finger insertion between said housing and said batteries whereby said housing may function as a carrying handle for said batteries and wherein said housing embodies means for permitting electrical contact between said metallic terminal connecting elements and an external electrical device.

2. The terminal connector of claim 1 wherein each of said metallic terminal connecting elements interconnect battery terminals of the same polarity for a parallel interconnection between said batteries.

3. The terminal connector of claim 1 wherein said housing is comprised of a rigid insulative plastic material.

4. The terminal connector of claim 3 wherein said metallic terminal connecting elements are comprised of substantially rigid wire.

5. The terminal connector of claim 1 wherein said means for permitting electrical contact comprises at least one aperture in said housing for permitting electrical contacting access to said metallic terminal connecting elements.

6. A terminal connector for externally interconnecting the terminals of two batteries, said connector comprising at least two separated metallic terminal connecting elements contained within an insulative housing characterized in that said metallic terminal connecting elements are structurally self supportive and wherein each of said metallic terminal connecting elements comprises portions thereof which protrude from said insulative housing for electrical and mechanical connection with said terminals, said insulative housing being offset from said interconnected batteries to permit finger insertion between said housing and said batteries whereby said housing may function as a carrying handle for said batteries and wherein said housing embodies means for permitting electrical contact between said metallic terminal connecting elements and an external electrical device wherein said means for permitting electrical contact comprises two apertures in said housing for permitting electrical contacting access to said metallic terminal connecting elements and wherein said metallic terminal connecting elements are supported within said housing by supportive elements and each of said apertures is positioned relative to each of said terminal connecting elements whereby external electrical contacts inserted within said apertures contact and resiliently bias said terminal connecting elements against said supportive elements for positive electrical engagement between said terminal connecting elements and said electrical contacts.

* * * * *